(12) United States Patent
Rapoport

(10) Patent No.: US 9,458,033 B2
(45) Date of Patent: Oct. 4, 2016

(54) WATER DESALINATION MECHANISM

(71) Applicant: Uri Rapoport, Moshav Ben Shemen (IL)

(72) Inventor: Uri Rapoport, Moshav Ben Shemen (IL)

(*) Notice: Subject to any disclaimer, the term of this patent is extended or adjusted under 35 U.S.C. 154(b) by 289 days.

(21) Appl. No.: 13/937,456

(22) Filed: Jul. 9, 2013

(65) Prior Publication Data
US 2013/0292334 A1    Nov. 7, 2013

Related U.S. Application Data

(63) Continuation-in-part of application No. 13/048,975, filed on Mar. 16, 2011, now abandoned.

(60) Provisional application No. 61/316,866, filed on Mar. 24, 2010.

(51) Int. Cl.
| | |
|---|---|
| *B01D 61/00* | (2006.01) |
| *B01D 63/00* | (2006.01) |
| *B01D 24/00* | (2006.01) |
| *B01D 25/00* | (2006.01) |
| *C02F 1/44* | (2006.01) |
| *F03B 13/00* | (2006.01) |
| *F03B 15/06* | (2006.01) |
| *B01D 61/10* | (2006.01) |
| *B01D 61/12* | (2006.01) |

(52) U.S. Cl.
CPC .............. *C02F 1/441* (2013.01); *B01D 61/10* (2013.01); *B01D 61/12* (2013.01); *C02F 1/44* (2013.01); *F03B 13/00* (2013.01); *F03B 15/06* (2013.01); *B01D 2313/243* (2013.01); *B01D 2313/246* (2013.01); *C02F 2201/009* (2013.01); *F05B 2220/20* (2013.01); *F05B 2220/602* (2013.01); *F05B 2220/62* (2013.01); *F05B 2270/3015* (2013.01); *Y02B 10/50* (2013.01); *Y02E 10/226* (2013.01)

(58) Field of Classification Search
CPC .... B01D 61/025; B01D 61/02; B01D 61/18; B01D 63/00; C02F 1/441; Y10S 159/901; Y10T 137/2599
USPC .......................... 210/652, 257.2; 137/115.11
See application file for complete search history.

(56) References Cited

U.S. PATENT DOCUMENTS

| | | | | |
|---|---|---|---|---|
| 3,917,526 | A | * 11/1975 | Jennings | ........................ 210/641 |
| 4,129,029 | A | * 12/1978 | Moll et al. | ................... 73/19.06 |
| 4,190,537 | A | * 2/1980 | Tondreau | ............... B01D 61/10 |
| | | | | 137/544 |
| 4,230,564 | A | 10/1980 | Keefer | |
| 4,243,523 | A | * 1/1981 | Pelmulder | ..................... 210/652 |
| 4,321,137 | A | 3/1982 | Kohler | |
| 4,352,025 | A | 9/1982 | Troyen | |

(Continued)

FOREIGN PATENT DOCUMENTS

| | | |
|---|---|---|
| WO | WO9823361 | 6/1998 |
| WO | WO2004065308 | 8/2004 |
| WO | WO2013023933 | 2/2013 |

*Primary Examiner* — Ana Fortuna
(74) *Attorney, Agent, or Firm* — Pearl Cohen Zedek Latzer Baratz LLP

(57) ABSTRACT

A water desalination mechanism, including: a running pipe, for fresh water; a venturi arrangement, having a first venturi nozzle, a second venturi nozzle and a branch between; the first and second nozzles; a container divided by a reverse osmosis membrane into a first side and a second side and having: a first side inlet, for contaminated water; a first side outlet, for remaining salts and/or minerals; and a second side outlet, for desalinated water.

13 Claims, 3 Drawing Sheets

(56) References Cited

U.S. PATENT DOCUMENTS

| | | | | |
|---|---|---|---|---|
| 4,387,575 A | | 6/1983 | Wenzel | |
| 4,391,713 A | * | 7/1983 | Smith | 210/652 |
| 4,584,061 A | | 4/1986 | Shelton | |
| 4,966,708 A | | 10/1990 | Oklejas et al. | |
| 4,973,408 A | | 11/1990 | Keefer | |
| 5,152,904 A | | 10/1992 | Kedem et al. | |
| 5,156,739 A | * | 10/1992 | Dawson et al. | 210/321.8 |
| 5,186,822 A | | 2/1993 | Tzong et al. | |
| 6,139,740 A | | 10/2000 | Oklejas | |
| 6,190,558 B1 | * | 2/2001 | Robbins | 210/652 |
| 6,193,893 B1 | * | 2/2001 | Mazzei et al. | 210/702 |
| 6,468,431 B1 | | 10/2002 | Oklelas, Jr. | |
| 8,025,157 B2 | | 9/2011 | Takita et al. | |
| 2011/0036775 A1 | | 2/2011 | Tarquin | |
| 2011/0042956 A1 | * | 2/2011 | Frye | F03B 17/00 290/54 |
| 2011/0044824 A1 | | 2/2011 | Kelada | |
| 2011/0109089 A1 | * | 5/2011 | Frye | F03B 13/08 290/54 |

\* cited by examiner

WATER DESALINATION MECHANISM

REFERENCE TO RELATED APPLICATIONS

This application is a Continuation-In-Part of U.S. patent application Ser. No. 13/048,975, filed on Mar. 16, 2011, and claims priority from U.S. Provisional Patent Application No. 61/316,866, filed on Mar. 24, 2010, both of which applications are hereby incorporated by reference in their entirety.

FIELD OF THE INVENTION

The present invention relates to a device and method for utilization of municipal water supply pressure for reverse osmosis.

The present invention will make use of the Venturi effect which is the reduction in fluid pressure that results when a fluid flows through a constricted section of pipe. According to the laws governing fluid dynamics, a fluid's velocity must increase as it passes through a constriction to satisfy the principle of continuity, while its pressure must decrease to satisfy the principle of conservation of mechanical energy. Thus any gain in kinetic energy a fluid may accrue due to its increased velocity through a constriction is negated by a drop in pressure. An equation for the drop in pressure due to the Venturi effect may be derived from a combination of Bernoulli's principle and the continuity equation.

Several inventions where presented in the art combining a venturi arrangement with a fluid pipe, including:

Schreiner, WO2013023933 disclosed a water supply system, comprising a first pipe, a water reservoir, and a Venturi pipe having a first Venturi nozzle terminal, a second Venturi nozzle terminal and a Venturi nozzle branch arranged between the first and second Venturi nozzle terminal, wherein the first Venturi nozzle terminal is connected via the first pipe to the water reservoir, wherein the first Venturi nozzle terminal is connectable to a second pipe to fill the water reservoir, wherein the branch of the Venturi pipe is connectable to a third pipe to supply taps, wherein water flows through the Venturi pipe from the first Venturi nozzle terminal to the second Venturi nozzle terminal when the water reservoir is filled, and water flows through the Venturi pipe from the second Venturi nozzle terminal to the Venturi nozzle branch during the supply procedure, to provide a water supply system which requires less maintenance and is less temperamental.

Shelton U.S. Pat. No. 4,584,061 disclosed a desalinization device including a portable, spherical tank with conduits to introduce water to be converted into steam in the lower zone of the tank and guide structure to guide the steam into a condensate bowl within the tank where it is collected; the device also included a conduit means to conduct cooling water to a cooling coil arranged in the condensate bowl to condense the steam; and within the conduits there was provided a Venturi arrangement in communication with the interior of the tank to reduce the pressure within the tank, hence lowering the boiling point of the water being heated; in a preferred embodiment Peltier devices are included as heat exchanging means in a heating and cooling circuit.

Kedem U.S. Pat. No. 5,152,904 disclosed a process for softening hard water by precipitation of calcium carbonate. The hard water is rendered alkaline, e.g. by the addition of sodium hydroxide, and is then contacted with a large excess of calcium carbonate crystals whose size does not exceed 100 microns, whereby precipitation occurs within a short contact time of the order of 2-60 seconds. Upon separation of soft water from calcium carbonate the bulk of the latter is re-circulated and excessive amounts are removed.

Thus, there is still along felt need for a water desalination mechanism that will exploit the municipal water supply pressure for reverse osmosis independent of any outer source of energy.

SUMMARY OF THE INVENTION

It is one object of the present invention to disclose a water desalination mechanism, comprising:
 a. a running pipe, for fresh water;
 b. a venturi arrangement, having a first venturi nozzle, a second venturi nozzle and a branch arranged therebetween; the first and second nozzles connected to the pipe;
 c. a container divided by a reverse osmosis membrane into a first side and a second side;
 d. a first side inlet, for contaminated water;
 e. a first side outlet, for remaining salts and/or minerals; and
 f. a second side outlet, for desalinated water;
wherein the second side outlet is in liquid connection with the venturi's branch, configured to make use of the vacuum created by the venturi arrangement to draw the desalinated water from the contaminated water via the reverse osmosis membrane and direct the desalinated water to the pipe.

It is another object of the present invention to disclose the water desalination mechanism, as mentioned above, wherein the desalination mechanism further comprising a measuring unit to measure the amount of the desalinated water directed to the pipe.

It is another object of the present invention to disclose the water desalination mechanism, as mentioned above, wherein the first side inlet is in liquid connection with the pipe, located ahead of the first venturi nozzle.

It is another object of the present invention to disclose a water desalination mechanism, comprising:
 a. a pipe for fluid flow having pressure $P_{210}$;
 b. a venturi arrangement, having a first venturi nozzle, a second venturi nozzle and a branch arranged therebetween; the first and second nozzles connected to the pipe, such that a vacuum pressure $P_{220}<P_{210}$ is created;
 c. a container divided by a reverse osmosis membrane into a first side, having pressure $P_{240}>P_{220}$, and a second side;
 d. a first side inlet, for contaminated water;
 e. a first side outlet, for remaining salts and/or minerals;
 f. a second side outlet, for desalinated water; and
 g. a fluid connection between the second side and the venturi's branch, such that the second side having the vacuum pressure $P_{220}$;
wherein the mechanism further comprising a piston configured move backward and forward, according to the pressure differences ($P_{220}$-$P_{240}$) between the vacuum pressure $P_{220}$ at the first side and pressure $P_{240}$ at the first side, and draw the desalinated water from the contaminated water via the reverse osmosis membrane.

It is another object of the present invention to disclose the water desalination mechanism, as mentioned above, wherein the piston comprises a sealing element configured to isolate the desalinated water from the fluid.

It is another object of the present invention to disclose the water desalination mechanism, as mentioned above, wherein the fluid connection comprises a control valve, configured to control the backward and forward movement of the piston, such that the desalinated water is drawn in batches.

It is another object of the present invention to disclose the water desalination mechanism, as mentioned above, wherein the first side comprises a floating element in mechanical connection with the control valve, configured to activate and deactivate the control valve, according to the contaminated water level at the first side.

It is another object of the present invention to disclose a method for utilizing the vacuum created by a venturi arrangement to desalinate contaminated water, the method comprising steps of:
a. providing:
  i. a pipe, for pressurized liquid flow;
  ii. the venturi arrangement having a first venturi nozzle, a second venturi nozzle and a branch arranged therebetween;
  iii. a container divided by a reverse osmosis membrane into a first side and a second side;
  iv. a first side inlet, for contaminated water;
  v. a first side outlet, for disposing remaining salts and/or minerals; and
  vi. a second side outlet, for desalinated water;
b. connecting the venturi's first and second nozzles to the pipe;
c. utilizing the vacuum created by the venturi arrangement for drawing the desalinated water from the contaminated water via the reverse osmosis membrane;
wherein the step of utilizing is obtained by connecting the venturi's branch with a fluid connection to the second side outlet, thereby directing the desalinated water to the pipe.

It is another object of the present invention to disclose a method for utilizing the vacuum created by a venturi arrangement to desalinate contaminated water, the method comprising steps of:
a. providing:
  i. a pipe, for pressurized fluid flow;
  ii. the venturi arrangement having a first venturi nozzle, a second venturi nozzle and a branch arranged therebetween;
  iii. a container divided by a reverse osmosis membrane into a first side and a second side;
  iv. a first side inlet, for contaminated water;
  v. a first side outlet, for disposing remaining salts and/or minerals; and
  vi. a second outlet, for desalinated water;
b. connecting the venturi's first and second nozzles to the pipe;
c. utilizing the vacuum created by the venturi arrangement for drawing the desalinated water from the contaminated water via the reverse osmosis membrane;
wherein the step of utilizing is obtained by connecting the venturi's branch with the container's second side via a fluid connection having a piston moving backward and forward, according to the pressure differences between the vacuum created by the venturi arrangement and the first side.

It is another object of the present invention to disclose the method, as mentioned above, further comprising step of providing the piston with a sealing element, for isolating the desalinated water from the fluid.

It is still an object of the present invention to disclose the method, as mentioned above, further comprising step of providing the fluid connection with a control valve, for controlling the backward and forward moving of the piston, thereby drawing the desalinated water in batches.

It is lastly an object of the present invention to disclose the method, as mentioned above, further comprising step of providing the first side with a floating element in mechanical connection with the control valve, for activating and deactivating the control valve, according to the contaminated water level at the first side.

BRIEF DESCRIPTION OF THE DRAWINGS

The invention is herein described, by way of example only, with reference to the accompanying drawings, wherein.

DETAIL DESCRIPTION OF THE SPECIFIC EMBODIMENTS

Figure 1:
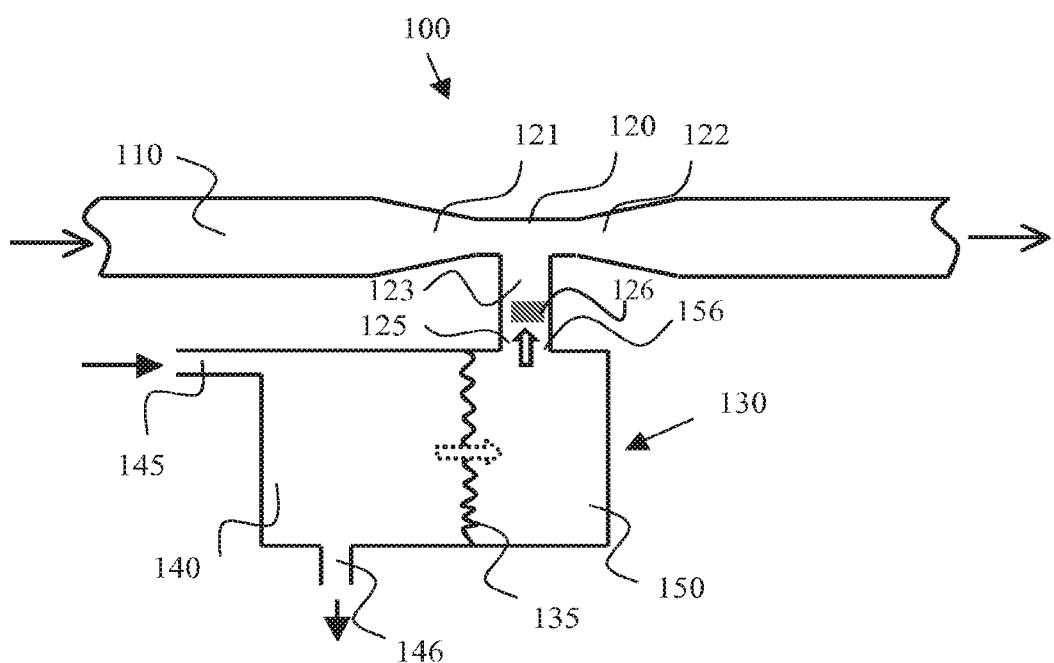
FIG. 1 is a schematic diagram showing one preferred embodiment for the present invention.

The following description is provided, alongside all chapters of the present invention, so as to enable any person skilled in the art to make use of the invention and sets forth the best modes contemplated by the inventor of carrying out this invention. Various modifications, however, is adapted to remain apparent to those skilled in the art, since the generic principles of the present invention have been defined specifically to provide a device and a method for desalinating water.

The term "reverse osmosis membrane" disclosed herewith in refers to a water purification technology that uses a semipermeable membrane. This membrane-technology is not properly a filtration method. In reverse osmosis, an applied pressure is used to overcome osmotic pressure, a colligative property, that is driven by chemical potential, a thermodynamic parameter. Reverse osmosis can remove many types of molecules and ions from solutions and is used in both industrial processes and to produce potable water. The result is that the solute is retained on the pressurized side of the membrane and the pure solvent is allowed to pass to the other side. To be "selective," this membrane should not allow large molecules or ions through the pores (holes), but should allow smaller components of the solution (such as the solvent) to pass freely.

The present invention discloses a new mechanism [100] for water desalination, comprising:
a. a running pipe [110], for fresh water;
b. a venturi arrangement [120], having a first venturi nozzle [121], a second venturi nozzle [122] and a branch [123] arranged therebetween; the first and second nozzles [121,122] connected to the pipe [110];
c. a container [130] divided by a reverse osmosis membrane [135] into a first side [140] and a second side [150];
d. a first side inlet [145], for contaminated water;
e. a first side outlet [146], for remaining salts and/or minerals; and
f. a second side outlet [156], for desalinated water;
wherein the second side outlet [156] is in liquid connection [125] with the venturi's branch [123], configured to make use of the vacuum created by the venturi arrangement [120] to draw the desalinated water from the contaminated water via the reverse osmosis membrane [135] and direct the desalinated water to the pipe [110].

The present invention further discloses another new mechanism [200] for water desalination, comprising:
a. a pipe [210] for fluid flow having pressure $P_{210}$;

b. a venturi arrangement [220], having a first venturi nozzle [221], a second venturi nozzle [222] and a branch [223] arranged therebetween; the first and second nozzles [221,222] connected to the pipe [210], such that a vacuum pressure $P_{220}<P_{210}$ is created;

c. a container [230] divided by a reverse osmosis membrane [235] into a first side [240], having pressure $P_{240}>P_{220}$, and a second side [250];

d. a first side inlet [245], for contaminated water;

e. a first side outlet [246], for remaining salts and/or minerals;

f. a second side outlet [256], for desalinated water; and g. a fluid connection [225] between the second side [250] and the venturi's branch [223], such that the second side having the vacuum pressure $P_{220}$;

wherein the mechanism [200] further comprising a piston [226] configured move backward and forward, according to the pressure differences ($P_{220}$-$P_{240}$) between the vacuum pressure $P_{220}$ at the first side and pressure $P_{240}$ at the first side [240], and draw the desalinated water from the contaminated water via the reverse osmosis membrane [235].

The present invention further discloses a new method for utilizing the vacuum created by a venturi arrangement to desalinate contaminated water, the method comprising steps of:

a. providing:
  i. a pipe, for pressurized liquid flow;
  ii. the venturi arrangement having a first venturi nozzle, a second venturi nozzle and a branch arranged therebetween;
  iii. a container divided by a reverse osmosis membrane into a first side and a second side;
  iv. a first side inlet, for contaminated water;
  v. a first side outlet, for disposing remaining salts and/or minerals; and
  vi. a second side outlet, for desalinated water;

b. connecting the venturi's first and second nozzles to the pipe;

c. utilizing the vacuum created by the venturi arrangement for drawing the desalinated water from the contaminated water via the reverse osmosis membrane;

wherein the step of utilizing is obtained by connecting the venturi's branch with a fluid connection to the second side outlet, thereby directing the desalinated water to the pipe.

The present invention further discloses a new method for utilizing the vacuum created by a venturi arrangement to desalinate contaminated water, the method comprising steps of:

a. providing:
  i. a pipe, for pressurized fluid flow;
  ii. the venturi arrangement having a first venturi nozzle, a second venturi nozzle and a branch arranged therebetween;
  iii. a container divided by a reverse osmosis membrane into a first side and a second side;
  iv. a first side inlet, for contaminated water;
  v. a first side outlet, for disposing remaining salts and/or minerals; and
  vi. a second outlet, for desalinated water;

b. connecting the venturi's first and second nozzles to the pipe;

c. utilizing the vacuum created by the venturi arrangement for drawing the desalinated water from the contaminated water via the reverse osmosis membrane;

wherein the step of utilizing is obtained by connecting the venturi's branch with the container's second side via a fluid connection having a piston moving backward and forward, according to the pressure differences between the vacuum created by the venturi arrangement and the first side.

Reference is now made to FIG. 1 demonstrating a preferred design for utilizing the water pressure of the municipal water supply for reverse osmosis desalination, with a mechanism [100] having:

a. a running pipe [110], for the fresh running municipal water;

b. a venturi arrangement [120], having a first venturi nozzle [121], a second venturi nozzle [122] and a branch [123] arranged therebetween; where the first and second nozzles [121,122] are connected to the pipe [110];

c. a container [130] for containing the water to be desalinated and the actual desalination process; the container [130] is divided by a reverse osmosis membrane [135] into a first side [140] and a second side [150].

The first side of the container [145] has a first side inlet [145], for the contaminated water and a first side outlet [146], for remaining salts and/or minerals. The second side of the container serves for the desalinated water which has passed through the reverse osmosis membrane. The second side of the container has a second side outlet [156].

In this preferred embodiment the second side outlet [156] is in liquid connection [125] with the venturi's branch [123], configured to make use of the vacuum created by the venturi arrangement [120] to draw the desalinated water from the contaminated water via the reverse osmosis membrane [135] and direct the desalinated water to the pipe [110], whilst discharging said remaining salts and/or minerals from the a first side outlet [146].

In another embodiment the desalination mechanism [100] further includes a measuring unit [126] adapted to measure the amount of the desalinated water directed to fresh water pipe [110].

Figure 2:
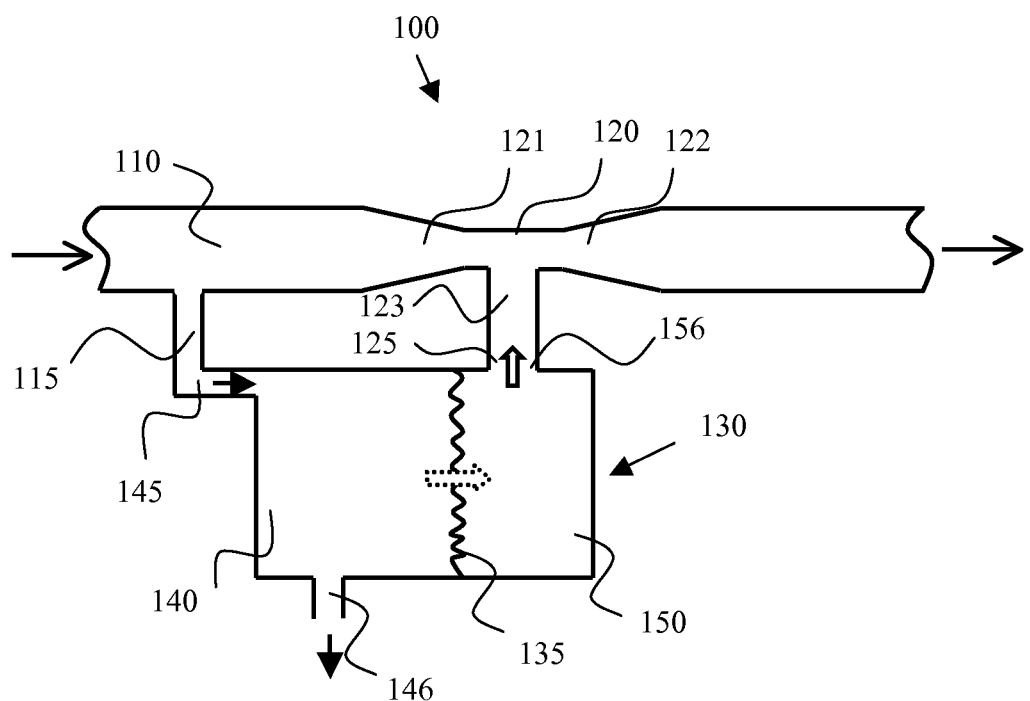
FIG. 2 is another schematic diagram showing the preferred embodiment for the present invention.

Reference is now made to FIG. 2 demonstrating another embodiment for the desalination mechanism [100] which further includes liquid connection [115] between the first side inlet [145] and the fresh water pipe [100], located ahead of the first venturi nozzle [121]. In such a design for the mechanism the fresh water are desalinated for improved or recovered from any undesired contaminates.

Figure 3:
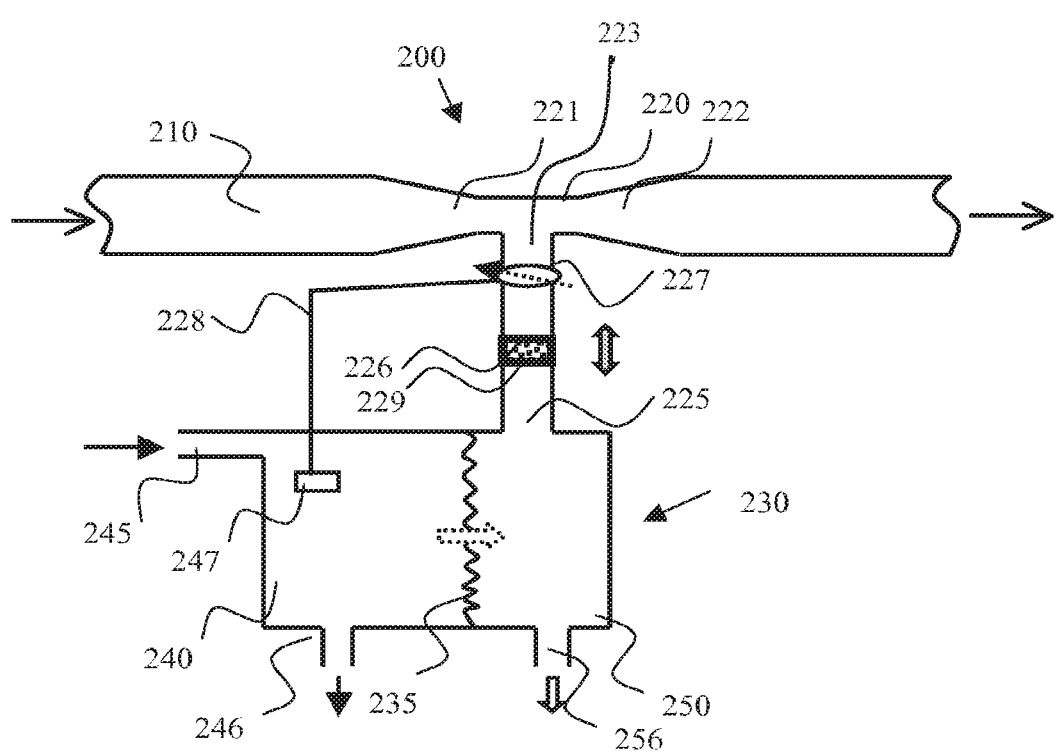
FIG. 3 is a schematic diagram showing another preferred embodiment for the present invention.

Reference is now made to FIG. 3 demonstrating a preferred design for utilizing a pipe [210] with pressurized fluid for reverse osmosis desalination, with a mechanism [200] having:

a. a pipe [210] for fluid flow having pressure $P_{210}$;

b. a venturi arrangement [220], having a first venturi nozzle [221], a second venturi nozzle [222] and a branch [223] arranged therebetween; the first and second nozzles [221,222] connected to the pipe [210], such that a vacuum pressure $P_{220}<P_{210}$ is created;

c. a container [230] divided by a reverse osmosis membrane [235] into a first side having pressure $P_{240}>P_{220}$, and a second side [250];

d. a first side inlet [245], for contaminated water;

e. a first side outlet [246], for remaining salts and/or minerals;

f. a second side outlet [256], for desalinated water; and g. a fluid connection [225] between the second side [250] and the venturi's branch [223], such that the second side having the vacuum pressure $P_{220}$;

The mechanism [200] further including a piston [226] configured move backward and forward, according to the pressure differences ($P_{220}$-$P_{240}$) between the vacuum pressure $P_{220}$ at the first side and pressure $P_{240}$ at the first side [240]. The piston [226] is therefore configured to draw the desalinated water from the contaminated water via the reverse osmosis membrane [235].

The piston [226] in another embodiment includes a sealing element [229] configured to isolate the desalinated water from the fluid.

In another embodiment the fluid connection [225] comprises a control valve [227], configured to control the backward and forward movement of the piston [226], such that the desalinated water is drawn in batches.

In yet another embodiment the first side [240] includes a floating element [247] in mechanical connection [228] with the control valve [227], configured to activate and deactivate the control valve [227], according to the contaminated water level at the first side [240].

The invention claimed is:

1. A water desalination mechanism [100], comprising:
   a. a running pipe [110] of pressurized fresh municipal water;
   b. a venturi arrangement [120] for creating vacuum, said venturi arrangement [120] having a first venturi nozzle [121], a second venturi nozzle [122] and a branch [123] arranged therebetween; said first and second nozzles [121, 122] are connected to said pipe [110];
   c. a container [130] divided by a reverse osmosis membrane [135] into a first side [140] and a second side [150];
   d. a first side inlet [145] connected to a source of contaminated water;
   e. a first side outlet [146] for disposing remaining salts and/or minerals; and
   f. a second side outlet [156] for desalinated water;
   wherein said second side outlet [156] is connected to said venturi's branch [123], thereby making use of the vacuum created by said venturi arrangement [120] to draw said desalinated water from said contaminated water via said reverse osmosis membrane [135] and direct said desalinated water to said pipe [110].

2. The water desalination mechanism [100] according to claim 1, wherein said desalination mechanism [100] further comprises a measuring unit [126] to measure the amount of said desalinated water directed to said pipe [110].

3. The water desalination mechanism [100] according to claim 1, wherein said first side inlet [145] is connected to said pipe [110] upstream of said first venturi nozzle [121].

4. A water desalination mechanism [200], comprising:
   a. a pipe [210] for fluid flow having pressure $P_{210}$;
   b. a venturi arrangement [220] having a first venturi nozzle [221], a second venturi nozzle [222] and a branch [223] arranged therebetween; said first and second nozzles [221, 222] are connected to said pipe [210], such that a vacuum pressure $P_{220}$, $P_{220} < P_{210}$, is created in said branch [223];
   c. a container [230] divided by a reverse osmosis membrane [235] into a first side [240], having pressure $P_{240}$, $P_{240} > P_{220}$, and a second side [250];
   d. a first side inlet [245] connected to a source of contaminated water;
   e. a first side outlet [246], for disposing remaining salts and/or minerals;
   f. a second side outlet [256], for desalinated water; and
   g. a fluid connection [225] between said second side [250] and said venturi's branch [223]; such that said second side is subjected to said vacuum pressure $P_{220}$
   wherein said mechanism [200] further comprises a piston [226] configured to move backward and forward, according to the pressure differences ($P_{220}$-$P_{240}$) between said vacuum pressure $P_{220}$ at said second side [250] and pressure $P_{240}$ at said first side [240], and draw said desalinated water from said contaminated water via said reverse osmosis membrane [235].

5. The water desalination mechanism [200] according to claim 4, wherein said piston [226] comprises a sealing element [229] configured to isolate said desalinated water from said fluid.

6. The water desalination mechanism [200] according to claim 4, wherein said fluid connection [225] comprises a control valve [227], configured to control said backward and forward movement of said piston [226], such that said desalinated water is drawn in batches.

7. The water desalination mechanism [200] according to claim 6, wherein said first side [240] comprises a floating element [247] in mechanical connection [228] with said control valve [227], said floating element [247] is configured to activate and deactivate said control valve [227], according to said contaminated water level at said first side [240].

8. A method for utilizing the pressure in a municipal pipeline to desalinate contaminated water, said method comprising the steps of:
   a. providing: (i). a venturi arrangement having a first venturi nozzle, a second venturi nozzle and a branch arranged therebetween; and (ii) a container divided by a reverse osmosis membrane into a first side and a second side; said container comprising a first side inlet connected to a source of contaminated water, a first side outlet for disposing remaining salts and/or minerals, and a second side outlet for desalinated water;
   b. connecting said venturi's first and second nozzles to said pipeline;
   connecting said venturi's branch to said second side outlet for desalinated water, thereby utilizing vacuum created by said venturi arrangement for drawing desalinated water from said contaminated water via said reverse osmosis membrane and directing said desalinated water to said pipeline.

9. A method for utilizing the pressure in a municipal pipeline to desalinate contaminated water, said method comprising the steps of::
   a. providing: (i). a venturi arrangement having a first venturi nozzle, a second venturi nozzle and a branch arranged therebetween; and (ii) a container divided by a reverse osmosis membrane into a first side and a second side; said container comprising a first side inlet connected to a source of contaminated water, a first side outlet for disposing remaining salts and/or minerals, and a second side outlet for desalinated water;
   b. connecting said venturi's first and second nozzles to said municipal pipeline;
   c. connecting said venturi's branch to said container's second side via a conduit comprising a piston moving backward and forward, according to the pressure differences between vacuum created by said venturi arrangement and said first side of the chamber, thereby utilizing said vacuum for drawing said desalinated water from said contaminated water via said reverse osmosis membrane.

10. The method according to claim 9, further comprising a step of providing said piston with a sealing element, for isolating said desalinated water from the fluid passing in said pipe.

11. The method according to claim 9, further comprising a step of providing said conduit with a control valve, for controlling said backward and forward moving of said piston, thereby drawing said desalinated water in batches.

12. The method according to claim 11, further comprising a step of providing said first side with a floating element in mechanical connection with said control valve, for activating and deactivating said control valve, according to said contaminated water level at said first side.

13. A water desalination mechanism [100], comprising:
   a. a running pipe [110] for pressurized water
   b. a venturi arrangement [120] for creating vacuum, said venturi arrangement [120] having a first venturi nozzle [121], a second venturi nozzle [122] and a branch [123] arranged therebetween; said first and second nozzles [121, 122] are connected to said pipe [110];
   c. a container [130] divided by a reverse osmosis membrane [135] into a first side [140] and a second side [150];
   d. a first side inlet [145] connected to a source of contaminated water;
   e. a first side outlet [146] for disposing remaining salts and/or minerals; and
   f. a second side outlet [156] for desalinated water;

wherein said second side outlet [156] is connected to said venturi's branch [123] and said first side inlet [145] is connected to said pipe [110] upstream of said first venturi nozzle [121], thereby making use of the vacuum created by said venturi arrangement [120] to draw said desalinated water from said contaminated water via said reverse osmosis membrane [135] and direct said desalinated water to said pipe [110].

\* \* \* \* \*